July 7, 1953     S. MENDELSOHN     2,644,381
SUPPORT AND HANDLE FOR CAMERAS AND SYNCHRONIZERS
Filed Nov. 30, 1949
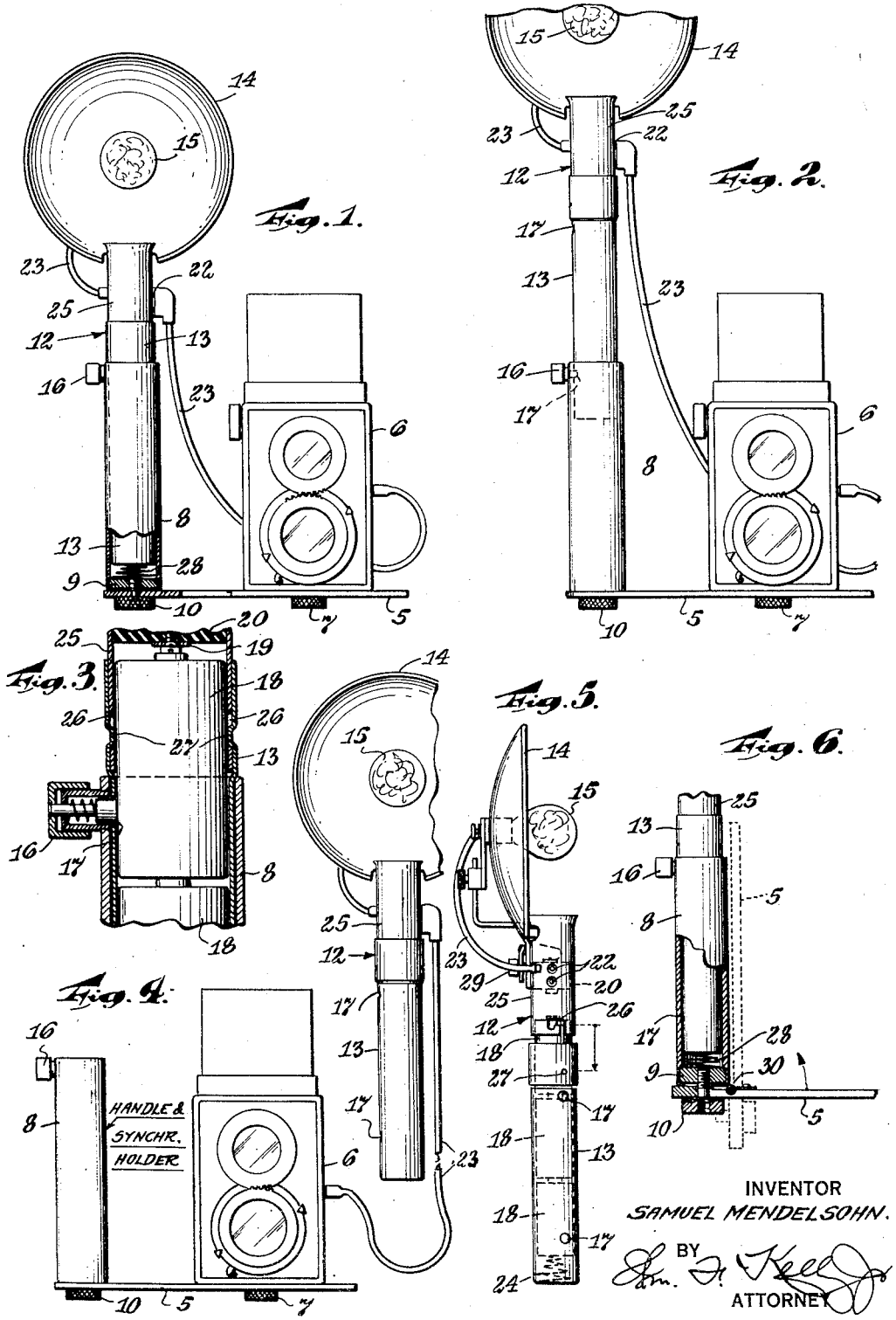
INVENTOR
SAMUEL MENDELSOHN.
BY
ATTORNEY Patented July 7, 1953

2,644,381

UNITED STATES PATENT OFFICE 2,644,381

SUPPORT AND HANDLE FOR CAMERAS AND SYNCHRONIZERS

Samuel Mendelsohn, Glen Ridge, N. J.

Application November 30, 1949, Serial No. 130,142

4 Claims. (Cl. 95—11.5)

The present invention relates to a camera synchronizer and more particularly to a support for the synchronizer and camera wherein such support also serves as a handle for holding the mounted camera and synchronizer during the taking of a photographic exposure.

It has heretofore been customary in the art to mount the synchronizer unit by means of a clamp to the side of a camera in more or less permanent arrangement, which thus fixes the position of the photoflash lamp and the reflector therefor, in a definite relationship to the camera lens. While in general this has proven satisfactory in the taking of photoflash lamp exposures, it has not been conducive of most efficient results, as often the projected beam of light from the photoflash lamp and its reflector is not concentrated on precisely the same area of an object to be photographed as viewed by the camera lens. In other words, assuming the camera lens to be equivalent to a light beam, it is highly desirable in most instances to have the axis of the light beam from the camera lens coincide with the axis of the light beam projected by the photoflash lamp precisely at the object to be photographed. In still further instances it is desirable to have the cross-sectional area of the light beam from the photoflash lamp and reflector not only coincide with the axis of the camera lens, but to have the actual light beam cover a greater area of the object, which can be obtained only by varying the object-distance between the camera and object on the one hand, and that between the object and the photoflash lamp and reflector on the other hand. Heretofore, so far as I am aware this has not been possible because of the substantially permanent mounting of the synchronizer unit in a fixed position relative to the camera.

It is accordingly the primary object of the present invention to provide a support for a camera and a synchronizer unit which enables the ready adjustment of the light beam projected by the synchronizer unit, so as to coincide with the axis of the light beam observed by the camera lens, at the object to be photographed and at substantially any variation in object-distance between the camera and object and the synchronizer unit and object.

Another object of the present invention is the provision of a support for a camera and synchronizer unit wherein the latter is mounted for axial and telescopic adjustment relative to the support with the latter serving as a handle by which the device may be held by a photographer during the taking of a photographic exposure.

A further object of the present invention is the provision of a support for a camera and synchronizer unit wherein the latter is mounted for axial and telescopic adjustment relative to the support with the latter serving as a handle by which the device may be held by a photographer during the taking of a photographic exposure and from which support the synchronizer unit may be readily detached when desired to alter the object-distance between the latter and the object to be photographed.

Still further objects of the present invention will become obvious to those skilled in the art by reference to the accompanying drawing wherein:

Figure 1 is an elevational view partly in cross-section showing a support for a camera and synchronizer unit in accordance with the present invention, Figure 2 is a view similar to Figure 1 but showing the synchronizer unit in an adjusted extensible position, Figure 3 is a fragmentary sectional view of the support of the present invention as shown in the preceding figures, Figure 4 is a view similar to Figure 1 but showing the synchronizer unit in a detached position relative to the supporting handle of the present invention, Figure 5 is a disassembled side elevational view of the synchronizer unit which is attachable to the support of the present invention, and Figure 6 is a fragmentary view partly in cross-section of a modification which the support of the present invention may take.

Referring now to the drawings in detail, the present invention as shown in Figure 1, comprises a base member 5, which may take the form of a bar or triangular plate, to the larger area portion of which a camera 6 is secured by means of a knurl-headed screw 7. At the opposite end or smaller area portion the base member 5 is provided with an elongated tubular sleeve 8, closed at the bottom thereof by an annual plate or disc 9 integral with the sleeve, and with the latter being secured to the base member 5 by a knurl-headed screw 10 similar to the screw 7. The synchronizer unit 12, comprising the battery case 13 with its reflector 14 and photoflash lamp 15, telescopically engages the sleeve 8 and is held therein by a spring-pressed plunger 16 which engages openings 17 provided at spaced intervals in the wall of the battery case 13, so as to hold the latter in various telescopically adjusted positions relative to the sleeve 8, such as shown in Figures 1 and 2. Also by slightly loosening the screw 10, the sleeve 8 together with the synchronizer unit carried thereby is axially adjustable about an axis perpendicular to the base member 5, and may be held in any axially adjusted position by again tightening the screw 10.

As can be seen from Figure 3, the battery case 13 houses the batteries 18 which make contact with a metallic contact terminal 19 carried by an insulated block 20. This block is provided with additional plug contacts 22 to which the control cables 23 are connected, as shown in Figures 1, 2, 4 and 5, and the bottom battery is grounded to the casing 13 by a coil spring 24 (Figure 5). To assemble the batteries 18 in the casing 13 they are dropped therein and an upper section 25, provided with substantially L-shaped slots 26 (Figure 5), is then depressed into telescopic engagement with pins 27 carried by the lower section of the casing 13 and turned slightly, thus forming a bayonet-clutch engagement between the upper section 25 and the remainder of the casing 13, which holds the batteries 18 in the casing 13 against the tension of the spring 24.

The synchronizer unit 12 is thus assembled and ready for telescopic insertion into the sleeve 8, either in its completely telescoped position as shown in Figure 1, when the bottom thereof contacts a coil-spring 28 (Figure 1), or in an extended position as shown in Figure 2, where it is held in place by the spring-pressed plunger 16 engaging the openings 17 in the casing 13. During the taking of a photograph, the photographer grasps the sleeve 8 as a handle for holding the photographic unit with one hand while he focuses the camera; and when ready for the exposure he need only press a switch button 29 (Figure 5) which causes complete opening of the camera shutter in synchronism with the moment of peak intensity from the photoflash lamp 15.

If for purposes of any particular photograph, the photographer desires to vary the object-distance between the object and the synchronizer unit to make it greater or less than that between the object and camera, he need only disconnect the telescopic engagement between the casing 13 and the sleeve 8 as shown in Figure 4. By grasping the sleeve 8 as a handle in one hand, he holds the synchronizer with the other hand in any desired spaced position and, after properly focusing the camera, presses the button 29 to initiate the exposure in the same manner as above described.

By reference now to Figure 6, the modification therein shown comprises connecting the sleeve 8 to the base member 5 by means of a hinge 30 which is secured to the base member 5 and to the closure disc 9 of the sleeve 8. Upon loosening of the screw 10 this enables the base member 5 to be moved about the pivot formed by the hinge 30, to position the base member 5 in substantially parallel relation with the sleeve 8, as shown in dotted lines of Figure 6, for storage and shipment and as described and claimed in my copending application Serial No. 130,141, filed concurrently herewith.

It can thus be readily appreciated from the foregoing that a support for a camera and synchronizer unit is provided by the present invention wherein the synchronizer unit is axially and telescopically adjustable relative to the support. Moreover, the synchronizer unit may be readily removed from the support for varying the position and spacing thereof relative to the camera and object and such support constitutes a handle by which the photographer can hold the entire photographic device.

Although two modifications of the present invention have been herein shown and described it is to be understood that still further embodiments thereof may be made without departing from the spirit and scope of the appended claims.

I claim:

1. A support and handle for a camera and synchronizer unit comprising a base member adapted to be secured to a camera and to extend a substantial distance in a horizontal plane relative to the upright portion of said camera, an elongated cylindrical sleeve having its closed end pivotally connected to the end of said base member opposite that to which the camera is secured and extending normal thereto to form a handle and adapted to be engaged by the battery case portion of a synchronizer unit in various telescopic positions relative thereto, and locking means carried by said elongated sleeve and engageable with the battery case portion of said synchronizer unit when inserted therein to retain the latter in its various telescopic positions relative to said elongated sleeve when inserted therein.

2. A support and handle for a camera and synchronizer unit comprising a base member adapted to be secured to a camera and to extend a substantial distance in a horizontal plane relative to the upright position of said camera, an elongated cylindrical sleeve having its closed end pivotally connected to the end of said base member opposite that to which the camera is secured and extending normal thereto to form a handle and adapted to be engaged by the battery case portion of a synchronizer unit in various telescopic positions relative thereto, said elongated sleeve with said telescopically engaged synchronizer unit being rotatably adjustable about the pivotal connection of the closed end of said elongated cylindrical sleeve to said base member, and locking means carried by said elongated sleeve and engageable with the battery case portion of said synchronizer unit to retain the latter in its various telescopic positions relative to said elongated sleeve when inserted therein.

3. A support and handle for a camera and synchronizer unit comprising a base member adapted to be secured to a camera and to extend a substantial distance in a horizontal plane relative to the upright position of said camera, an elongated cylindrical sleeve having its closed end pivotally connected to the end of said base member opposite that to which the camera is secured and extending normal thereto to form a handle and adapted to be engaged by the battery case portion of a synchronizer unit in various telescopic positions relative thereto, said elongated sleeve with said telescopically engaged synchronizer unit being rotatably adjustable about the pivotal connection of the closed end of said elongated cylindrical sleeve to said base member, and a spring-pressed plunger carried by said elongated sleeve and engageable with openings provided in the battery case portion of said synchronizer unit to retain the latter in its various telescopic positions relative to said elongated sleeve when inserted therein.

4. A support and handle for a camera and synchronizer unit comprising an elongated base member provided with a fastening screw adapted to engage a camera and extending a substantial distance in a horizontal plane when secured to said camera, an elongated cylindrical sleeve having its closed end secured to said base member by a fastening screw engaging the closed end thereof to form a pivotal connection to enable rotary adjustment of said elongated cylindrical sleeve relative to said base member and for firmly securing said sleeve to said base member in any desired rotatably adjusted position, said elongated cylindrical sleeve adapted to be engaged by the battery case portion of a synchronizer unit in various telescopic positions relative thereto, and a spring-pressed plunger carried by said elongated cylindrical sleeve and engageable with openings provided in the battery case portion of said synchronizer unit to retain the latter in its various telescopic positions relative to said elongated cylindrical sleeve when inserted therein and to cause rotary movement of said synchronizing unit along with said elongated cylindrical sleeve about the pivotal connection formed by its fastening screw upon adjustment of said elongated cylindrical sleeve.

SAMUEL MENDELSOHN.

References Cited in the file of this patent

UNITED STATES PATENTS

| Number | Name | Date |
|---|---|---|
| 1,979,942 | Johnson et al. | Nov. 6, 1934 |
| 2,049,735 | Grogin | Aug. 4, 1936 |
| 2,176,972 | Lindahl | Oct. 24, 1939 |
| 2,295,853 | Ley | Sept. 15, 1942 |
| 3,310,165 | Steiner | Feb. 2, 1943 |
| 2,314,829 | Hunter | Mar. 23, 1943 |

FOREIGN PATENTS

| Number | Country | Date |
|---|---|---|
| 185,986 | Switzerland | Aug. 31, 1936 |